J. G. DUDLEY.
MOTOR VEHICLE.
APPLICATION FILED MAY 3, 1909.
1,266,431.
Patented May 14, 1918.
3 SHEETS—SHEET 1.
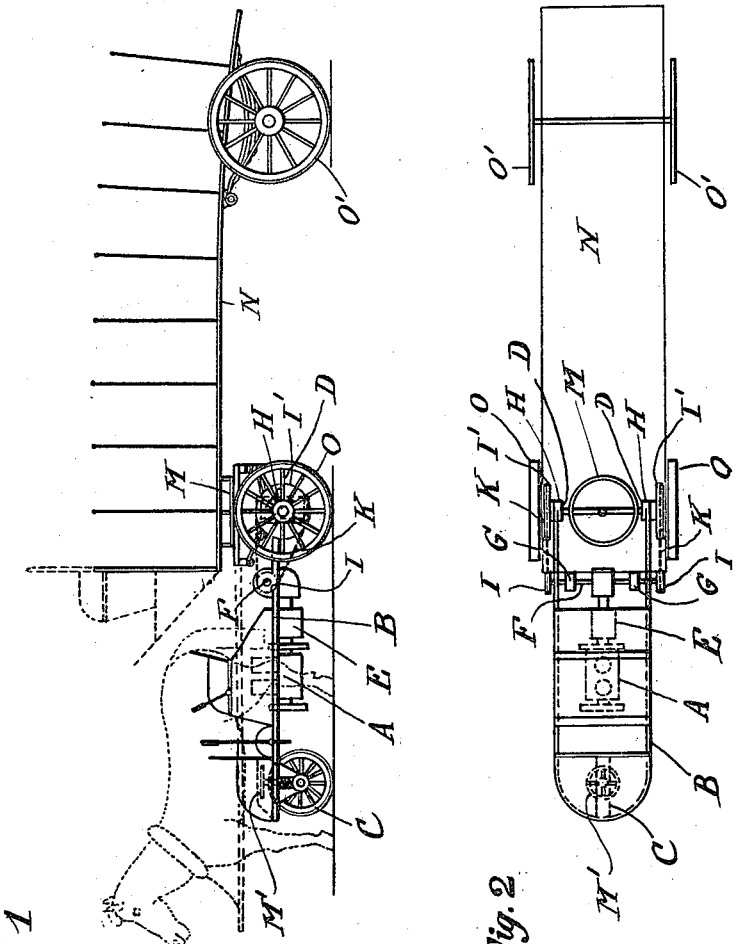

J. G. DUDLEY.
MOTOR VEHICLE.
APPLICATION FILED MAY 3, 1909.

1,266,431.

Patented May 14, 1918.
3 SHEETS—SHEET 2.

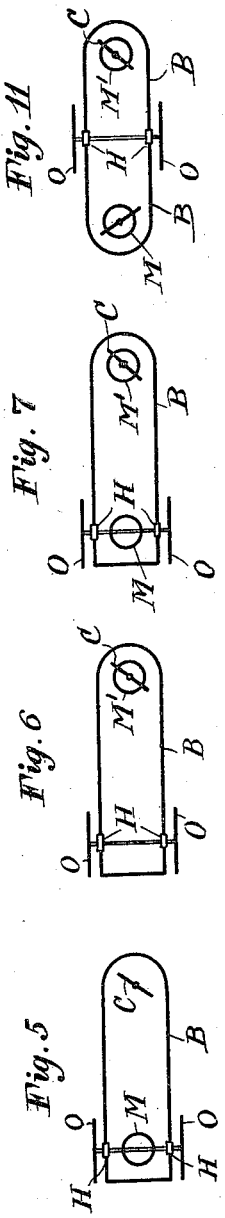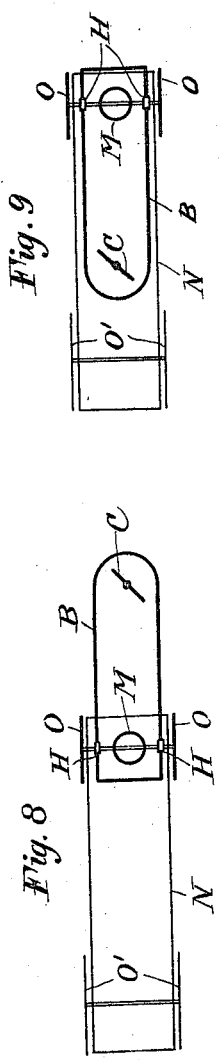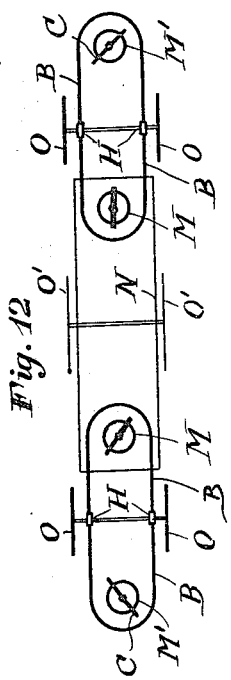

UNITED STATES PATENT OFFICE.

JAMES GRIEVE DUDLEY, OF BROOKLYN, NEW YORK.

MOTOR-VEHICLE.

1,266,431.  Specification of Letters Patent.  Patented May 14, 1918.

Application filed May 3, 1909. Serial No. 493,549.

*To all whom it may concern:*

Be it known that I, JAMES GRIEVE DUDLEY, a citizen of the United States, residing at Brooklyn, in the county of Kings, in the city and State of New York, have invented a new and useful Motor-Vehicle Embodying a New System of Motor-Vehicle Propulsion, of which the following is a specification.

My invention relates to motor vehicles in which there is articulation in all directions at the fifth wheel and the axle supporting it, in which preferably fixed axles are employed, with dished driving wheels propelled by driving pinions in the same plane with the driving wheels; in which the tractor is three-wheeled; in which standard horse vehicles may be transformed into my improved power vehicles without discarding parts; in which the forward trucks are not discarded, but may be incorporated in the new construction; in which the power plant is spring-mounted; in which there is a three-point support of the power plant and three-point support of the load; in which for turning about the tractor may be put at right angles to the vehicle; in which the turning radius of the vehicle may be lessened; in which the wheel base may be reduced and is at a minimum.

The objects of my improvement are:

1st. To provide a motor vehicle which is adapted to all conditions of traffic, all roads and imperfections of roads, and to the narrowest practicable widths of road.

2nd. To provide an improved motor vehicle made out of existing horse-drawn vehicles by the addition of an engine or its equivalent and the steering wheel, without discarding any essential part of the existing vehicle; and in which, if desired, new wheels may be substituted for the existing wheels of a horse-drawn vehicle without discarding any other parts.

3rd. To enable the manufacturer to avail himself of the development of horse vehicles with the minimum of change, and thus avail himself of all the advantages of power vehicles.

4th. To provide a power vehicle in which one tractor may propel several vehicles in succession, with time for loading and unloading while the tractor is propelling one loaded vehicle that is ready for transit.

5th. To provide a power vehicle in which there may be interchange of the tractor with vehicle bodies, and in which tractor construction or power construction may be carried on independent of vehicle construction and without change in vehicle construction.

6th. To provide a power vehicle of the shortest wheel base, of the shortest turning radius, of the cheapest construction, of the greatest durability, convenience, and the least cost of operation and of maintenance, of the greatest simplicity and of the minimum of depreciation.

7th. To provide a power vehicle which can be readily converted back into a horse vehicle, or vice versa.

Other objects will appear from the hereinafter description.

I attain these objects by the construction illustrated in the accompanying drawings, in which similar letters refer to similar parts throughout the several views.

Figure 1 is a side view of my motor vehicle and tractor, with the displaced horse shown in dotted lines;

Fig. 2 is a plan view thereof;

Fig. 5 is a diagrammatic view of the three-wheeled tractor, with the fifth wheel central over the driving wheel axle;

Fig. 6 is a diagrammatic view of the tractor with the fifth wheel over the steering wheel;

Fig. 7 is a diagrammatic view of a three-wheeled tractor, with the fifth wheel central over the steering wheel axle and another fifth wheel central over the driving wheel axle;

Fig. 8 is a diagrammatic view of a three-wheeled tractor and of the vehicle body, with the rear wheels coupled as in Fig. 1;

Fig. 9 is a diagrammatic view of the tractor and vehicle body coupled as in Fig. 2;

Fig. 10 is a diagrammatic view of the tractor No. 6 coupled to the vehicle at the fifth wheel over the steering wheel;

Fig. 11 is a diagrammatic view of a modified tractor with two steering wheels, or one steering wheel and one idler;

Fig. 12 is a diagrammatic view of the tractors of Fig. 11, two in number, coupled with the modified vehicle for carrying a live load in train.

Figure 3:
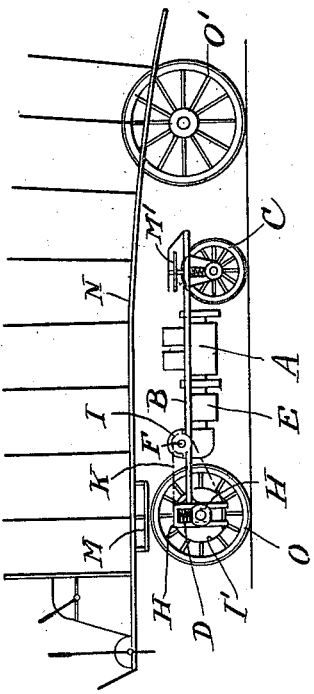
Fig. 3 is a side view of my motor vehicle with the tractor and steering wheel under the body of the vehicle.

A is the motor, which may employ gas, gasolene, steam, electricity or any other power;

B is the frame of the support;
C is the steering wheel;
D is a spring suspension between the frame and the drawing axle;
E is the speed change;
F is the power transmission shaft;
G and G are clutches;
H and H are hinges on the main axle;
I is the driving sprocket, and
I' is the driven sprocket;
K and K are sprocket chains;
M is the fifth wheel;
M' is the fifth wheel at the steering wheel;
N is the vehicle, here shown as an ordinary truck;
O and O' are the driving wheels and the wheels of the vehicle, respectively.

I have omitted the gas or gasolene tanks, the boiler, the storage battery, or other source of power, the levers for operating the motor, the springs, wheel brakes and speed devices, the connecting rods, valves, piping and all details of that nature, as their construction and operation are well-known, and in my invention any preferred form of any of them may be incorporated.

I prefer the fixed axle suitably bent to employ dished driving wheels O in such manner as to support the load on spokes always in the perpendicular. The plane of the wheels as a whole will therefore be inclined outwardly at the top.

My improved power vehicle is well illustrated by the transformation of a heavy horse truck into a power truck without discarding any of the parts of the former. I will now describe this by way of illustration merely from which it will be apparent that any horse vehicle may be similarly transformed into a power vehicle, whatever its weight, load or intended uses may be, and that wholly new construction may be similarly made.

I begin with the ordinary commercial truck, discarding merely the pole and employing all other parts. To each of the forward wheels O, I make fast a driven sprocket wheel I'. To the forward axle I secure the frame B of the tractor by a hinge connection H with spring support D interposed, which springs are more readily yielding than the load supporting vehicle springs on the axle. This construction has an adjustment to provide for elongation of the driving chains K. The tractor frame is provided with a steering wheel C at the other end of the frame, which with the forward wheels O of the truck N furnish three-point support for the tractor which carries the motor A, the power plant, the final drive, the driver's seat, the transmission and all the accessories not necessary to further describe, and which may be of any known construction. The transmission shaft F is provided with driving sprocket wheels I, one at either end, each in the same plane with the corresponding driven sprocket wheel I', and each pair is connected with a sprocket chain.

Having incorporated the forward wheels and axle in the tractor and having placed the tractor under the forward end of the truck, the transformation or construction is complete.

Figure 4:
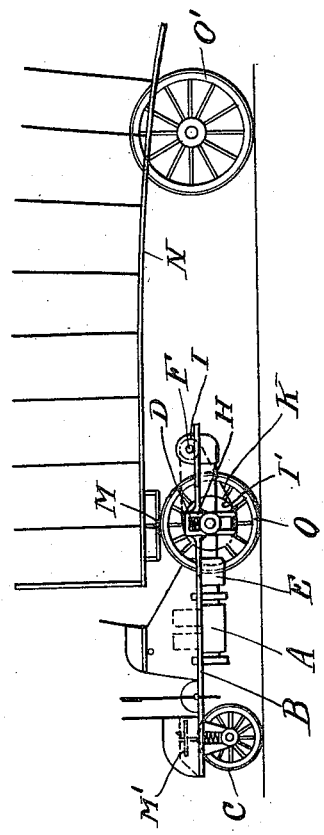
Fig. 4 is a motor vehicle, in which the transmission gears, differential and driving sprocket wheel are differently located.

I may substitute other tires for the original iron tires; I may provide special forward wheels in place of those found on the commercial truck, which I have hereinbefore described as being transformed into a power truck; and in wholly new construction, I may provide wheels of any desired form made by adaptations not necessary to describe; I may employ a live axle with driving wheels fixed thereon. I may turn the tractor and steering wheel under the body of the vehicle, as in Fig. 3. I may locate the transmission gears, differential and driving sprocket wheels behind the driving wheel, as in Fig. 4 and I may construct my improved motor vehicle in any of the varied forms shown in the diagrammatic views 5, 6, 7, 8, 9, 10, 11 and 12, or in any other combinations thereof.

It will be seen that in my construction, I thus obtain flexibility lengthwise by spring supports D shown in Fig. 1 and by the swivel action of the frame on the forward axle of the truck. I get flexibility sidewise by the fifth wheel. I get torsion flexibility by the original vehicle springs and by the three-point support of the three-wheeled tractor on the ground, and by three-point support of the vehicle body on the two rear wheels and on the fifth wheel forward, together with the springs described; and I thus greatly reduce torsion strain. I may construct the tractor as in Fig. 11 with the steering wheel forward and an idle trailer at the opposite end of the tractor frame, and thus also eliminate or at least greatly reduce torsion strain.

The uses of my improved motor vehicle are manifold and may be employed in train as in Fig. 12, and in trains of any length and number of vehicles or of power elements. It is obvious that one tractor may be employed on a number of wagon bodies where the loading and unloading occupy considerable time, the tractor being released from the body of the vehicle while the loading and unloading are going on, and be in a moment attached to another wagon body which is ready for transit. I may also transform my power vehicle back again to a horse-drawn vehicle by disconnecting the tractor frame from the axle.

I may by transmission means transmit power not merely to the forward driving wheels, but also to the rear wheels of my motor vehicle, and without further description, it is manifest that the three-point support tractor has ready and multiple adaptations to all forms of motor vehicles, either by original manufacture of the vehicle as a whole, or by transforming any existing horse-drawn vehicles into a motor vehicle, with the minimum change of parts, or with discarding but few. I may provide a friction brake on the fifth wheel, and may employ ballast.

Having now described my invention, what I claim as new and desire to secure by Letters Patent is—

In a motor vehicle, the combination with a carriage including a load supporting body portion, a tractor wheel axle provided with tractor wheels and a fifth wheel constituting part of the steering mechanism of the vehicle, with one element of the fifth wheel construction connected to the body portion, of a propelling unit connected to the other element of the fifth wheel construction and including a frame engaging the axle to draw on the same and free to move vertically thereon thereby to provide for relative vertical articulation between the propelling unit and said body portion about said axis and also providing a rocking articulation about an axis extending longitudinally of the propelling unit and at right angles to the axle and coacting with the fifth wheel construction to complete the steering mechanism thereby providing articulation about a vertical axis perpendicular to the axle, said unit provided with a ground engaging wheel for supporting at least part of the weight of the power plant, a power plant carried by the unit, driving means connecting the power plant with one of the tractor wheels of the vehicle to propel the same and a resilient mounting for the power plant for cushioning the same from external shocks in all positions of the power plant relative to the body portion.

In testimony whereof, I have hereunto set my hand, at the city, county and State of New York, this 28th day of April, 1909.

JAMES GRIEVE DUDLEY.

In presence of—
 FRANK EUFEMIA,
 JOHN J. RANAGAN.